W. ZUROVEC, Jr.
CAPTIVE FLYING MACHINE OF THE HELICOPTER TYPE.
APPLICATION FILED MAR. 9, 1920.

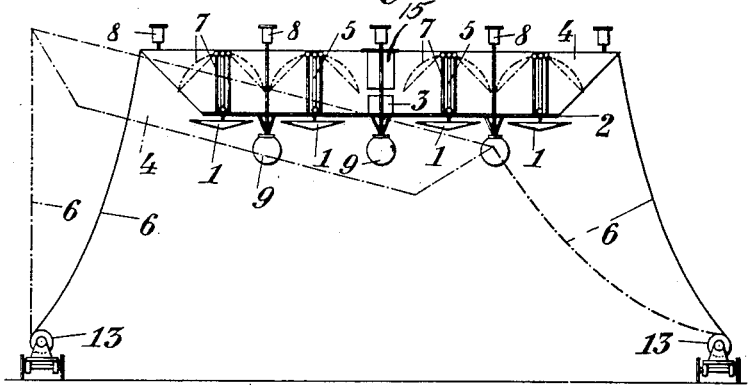
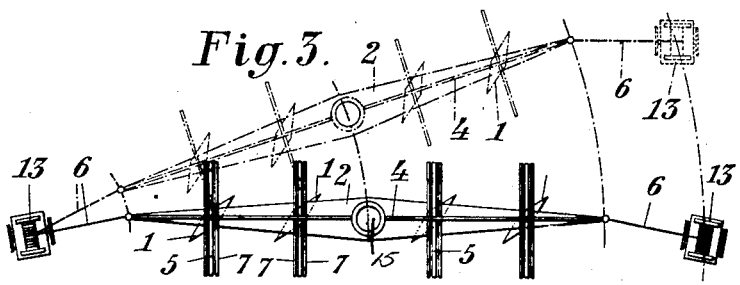
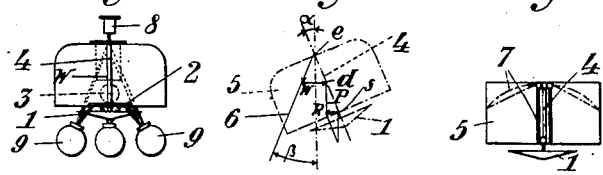
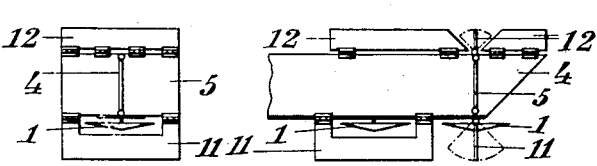

1,397,998.

Patented Nov. 22, 1921.
2 SHEETS—SHEET 2.

Inventor
W. Zurovec, Jr.
By H. R. Kerslake
Attorney

UNITED STATES PATENT OFFICE.

WILHELM ZUROVEC, JR., OF FISCHAMEND, NEAR VIENNA, GERMAN AUSTRIA.

CAPTIVE FLYING-MACHINE OF THE HELICOPTER TYPE.

1,397,998. Specification of Letters Patent. Patented Nov. 22, 1921.

Application filed March 9, 1920. Serial No. 364,605.

*To all whom it may concern:*

Be it known that I, WILHELM ZUROVEC, Jr., a citizen of the Czecho-Slovakia Republic, residing at Fischamend, near Vienna, German Austria, have invented certain new and useful Improvements in Captive Flying-Machines of the Helicopter Type, of which the following is a specification.

This invention has for its object to provide an improved flying machine of the helicopter type which can be sent up and taken down at will, like a captive balloon.

The main difficulties experienced hitherto in providing a satisfactory captive helicopter have been:—

The difficulty of manufacturing screws with a not too great diameter, which show a favorable specific lifting power (kgs. per H. P.);

Further, the difficulty of giving the helicopter such a shape that, without being driven down by the wind, it can be kept in a stable condition.

Another difficulty is to assure that in the case of the engine breaking down, the machine shall be capable of a landing without a smash.

All these conditions are satisfied by the improved construction according to the present invention, so that the improved captive flying machine of this invention has all the advantages of a captive balloon without its drawbacks, such as inconvenience in transport, numerous accessories, large target, and risk of catching fire and exploding.

The present invention consists in a captive flying machine of the helicopter type, comprising screw-raising mechanism acting on the air, and a plurality of securing ropes applied to the framework of the said helicopter at points apart from one another, the said securing ropes diverging toward the ground whereby during gusts of wind the resulting mass movement of the helicopter causes it to become inclined, thus causing the formation of a component of the force of the said screw raising mechanism, which component acts against the force of the wind and thus tends to bring the helicopter back again into its normal position.

In the accompanying drawings that illustrate diagrammatically a constructional example of captive helicopter according to the present invention:—

Figure 1 is a front elevation;

Fig. 2 is a side elevation; and

Fig. 3 is a plan of the improved captive flying machine.

Fig. 4 is a diagram of the action of the forces.

Figs. 5 and 6 are views taken at right angles to each other of a detail.

Fig. 7 is a partial cross sectional view of the helicopter when falling, showing the position of certain automatically operated planes.

Figure 8:
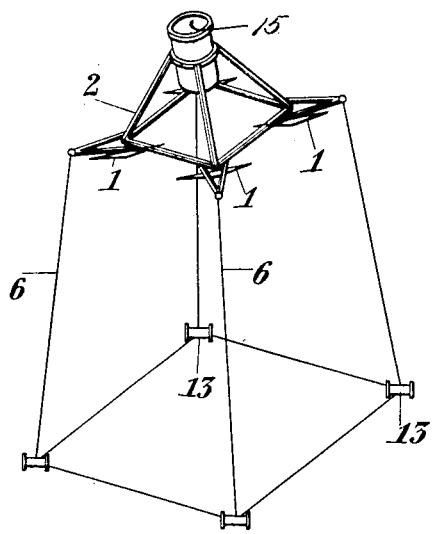
Figs. 8 and 9 illustrate two further constructional forms of the improved captive helicopter.

A plurality of lifting screw propellers is arranged in a plane, for instance along a girder, with the result that, at medium speeds of revolution with ordinary air screw propellers, such favorable specific lifting forces are obtained as could only be obtained hitherto with large screw propellers constructed in the form of supporting surfaces.

In the present case the screws 1 are arranged on the under side of a girder 2 that carries the engine 3 serving as the common drive for the screws 1. These screws, instead of being arranged on the under side of the girder, may be arranged on the upper side of the said girder.

5 are damping surfaces which may be arranged at right angles to the girder 2. This arrangement of the air screw propellers in conjunction with the damping surfaces 5 tends to diminish the mutual interference between adjacent propellers and thus the total lifting force is greater with this arrangement than with any other arrangement of the same propellers.

These damping surfaces 5 also act as directing surfaces tending to cause the captive machine to place itself always at right angles to the wind. The captive flying machine is held to its place of anchorage by means of ropes 6 attached to the top edge of the supporting frame. A vertical surface 4 is arranged along the girder 2 and acts as a stabilizing plane.

This arrangement affords a security against upsetting because the point of application of the resultant of the wind forces W is arranged to come below the securing point *e*, but above the center of gravity S. The wind force W gives to the machine a determined inclination β such that the pull of the screw P is no longer vertical, but resolves itself into a component R opposing the wind force W. By suitable selection of the ditance of the center of gravity S from the point $d$, at which the wind forces act, and the plane of the securing points $e$, the machine can be caused to hover in stable suspension, even with considerable wind forces, at a moderate inclination and with a very small drift angle $\beta$ from the point of anchorage. (Fig. 4.)

The stability in the horizontal direction is obtained, according to this invention, by arranging the securing means in a trapezoidal manner, i. e., the distance between the points of anchorage of the free ends of the securing ropes on the ground is greater than the distance between the points of attachment at the apparatus. This arrangement causes the apparatus to assume an inclined position when struck by lateral gusts of wind (dotted position, Fig. 1) whereby the screw pull resolves itself into a component oppositely directed to the force of the wind and thus tries to bring the apparatus back into the horizontal position.

The carrying frame may be made four cornered. In this case securing ropes are attached to all four corners and are divergent toward their lower ends, like the sides of a trapezoid, as described above (Fig. 8).

The securing ropes may in both cases be parallel for a certain length and may then diverge toward the ground in the manner of a trapezoid.

By the above described combination of stabilizing arrangements the hovering position of the helicopter is kept in a stable state in all directions without the employment of mechanical means.

In order to prevent, on the motor suddenly stopping a headlong descent of the helicopter taking place, both sides of the frame girder may be provided with planes 7 which open automatically as shown in Figs. 1 and 7, on the apparatus falling suddenly, and acting in the manner of parachutes, cause the apparatus to glide down gently and reduce the final speed to such an extent that by means of suitable shock absorbing or braking means, the kinetic energy of the falling apparatus can be consumed, without the helicopter being damaged.

The mode of arranging the screws, below the framework of the helicopter makes the provision of ordinary parachutes possible, which open at a given moment. The containers 8 indicated at the upper side of the apparatus (Figs. 1 and 2) serve for holding the parachutes when not in action.

Both the planes 7 and the parachutes may preferably be fitted in such a manner as to be capable of being brought into action automatically or manually by the flier or the attendants on the ground.

For shock absorption, in the case in question several hollow bodies 9 are provided filled with compressed air, which hollow bodies 9 are fitted with preferably adjustable discharging valves, arranged to discharge at some definite pressure like a safety valve. This arrangement prevents the otherwise unavoidable shock to the apparatus when it strikes the ground.

As already mentioned, the helicopter remains steadily in the air, owing to its stabilizing arrangement, as long as the points of anchorage on the ground do not alter their location, but it can also be towed, as the wind created by the towing gives the screw pull such an inclination that the horizontal component of the screw pull compensates the resistance to movement.

This capability of the helicopter to be towed applies more particularly in the case where vessels are used for towing.

In order to be able to regulate the inclination and thereby the horizontal displacement of the helicopter in any direction by hand, rudders 11 are preferably fitted in the path of the wind created by the screws, which rudders, according to the manner in which they are set, cause an inclination of the apparatus in one direction or the other.

The same object may be attained by lengthening or shortening the securing ropes or by varying the pull of the screws.

According to a further modification rudders 12 may be fitted in the path of the air current caused by the apparatus falling, which, on the motor suddenly failing, may be set either by hand or automatically operated by means of the relatively upward current of air caused when the helicopter falls in such a manner that the helicopter will glide down in any predetermined direction, even in the opposite direction to that of the wind.

Figure 9:
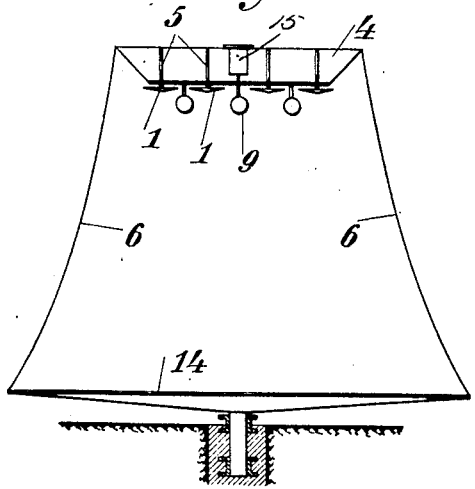

In order to prevent a crossing of the securing ropes in it necessary, when the direction of the wind changes for the rope winches 13 on the ground to follow the said changes of the wind. This may be effected either by at least one of the winches 13 being made movable or by the securing ropes, as shown in Fig. 9, being fixed to a horizontal girder 14, which is journaled so as to be rotatable about a vertical axis.

The latter arrangement has the advantage that the helicopter sets itself automatically correctly perpendicular to the direction of the prevailing wind even when the wind veers around through a large angle.

The pilot's basket 13 is disposed, as indicated in the drawing, above the plane of the screws, so that the flier is clear of any wind from the screws and has a perfectly clear view upward and in the horizontal plane.

What I claim is:—

1. A captive flying machine of the helicopter type, comprising screw-raising mechanism acting on the air, and a plurality of securing ropes applied to the framework of the said helicopter at points apart from one another, the said securing ropes diverging toward the ground, whereby during gusts of wind the resulting mass movement of the helicopter causes it to become inclined, thus causing the formation of a component of the force of the said screw raising mechanism, which component acts against the force of the wind and thus tends to bring the helicopter back again into its normal position.

2. A captive flying machine of the helicopter type as claimed in claim 1, having plane stabilizing mechanism so arranged that the center of force of the wind forces acting thereon lies below the points of attachment of the ropes to the helicopter, but above the center of gravity of the helicopter, it being assumed that the helicopter is in its normal or upright position.

3. A captive flying machine of the helicopter type as claimed in claim 2, having cross planes so arranged that, by tending to keep themselves parallel to the direction of the wind, the said cross planes thus also tend to keep the horizontal axis of the plane stabilizing mechanism at right angles to the direction of the wind.

4. A captive flying machine of the helicopter type as claimed in claim 3, in which the screw-raising mechanism comprises a plurality of screws, and in which the cross planes are vertical and act as damping planes so as to diminish the mutual interference between adjacent screws of the said screw raising mechanism.

5. A captive flying machine of the helicopter type, as claimed in claim 1, wherein the screw-raising mechanism is fitted below the carrying frame for the purpose of allowing the wind from the said screw-raising mechanism to leave freely, thus obtaining an increased lifting power.

6. A captive flying machine of the helicopter type as claimed in claim 1, comprising a winch engaging the lower end of the securing ropes, the said winch being movable so that, on the direction of the wind changing, the place of anchorage may be rapidly changed.

7. A captive flying machine of the helicopter type as claimed in claim 1, wherein the securing ropes are attached to a girder mounted so as to rotate about a vertical axis for the purpose of obtaining an automatic adjustment of the apparatus perpendicular to the prevailing direction of the wind, even when the wind veers around through a large angle.

8. A captive flying machine of the helicopter type as claimed in claim 1, comprising supporting planes disposed so as to open on the motor stopping and act as a parachute.

9. A captive flying machine of the helicopter type as claimed in claim 1, wherein a pilot's basket is fitted above the plane of the screws so that the pilot is on the one hand clear of the wind from the screws, and on the other hand has a clear view upward and in the horizontal plane.

In testimony whereof I have signed my name to this specification.

WILHELM ZUROVEC, Jr.